INVENTOR.
PAUL E. OLSON
BY
Adelbert A. Steinmiller
ATTORNEY

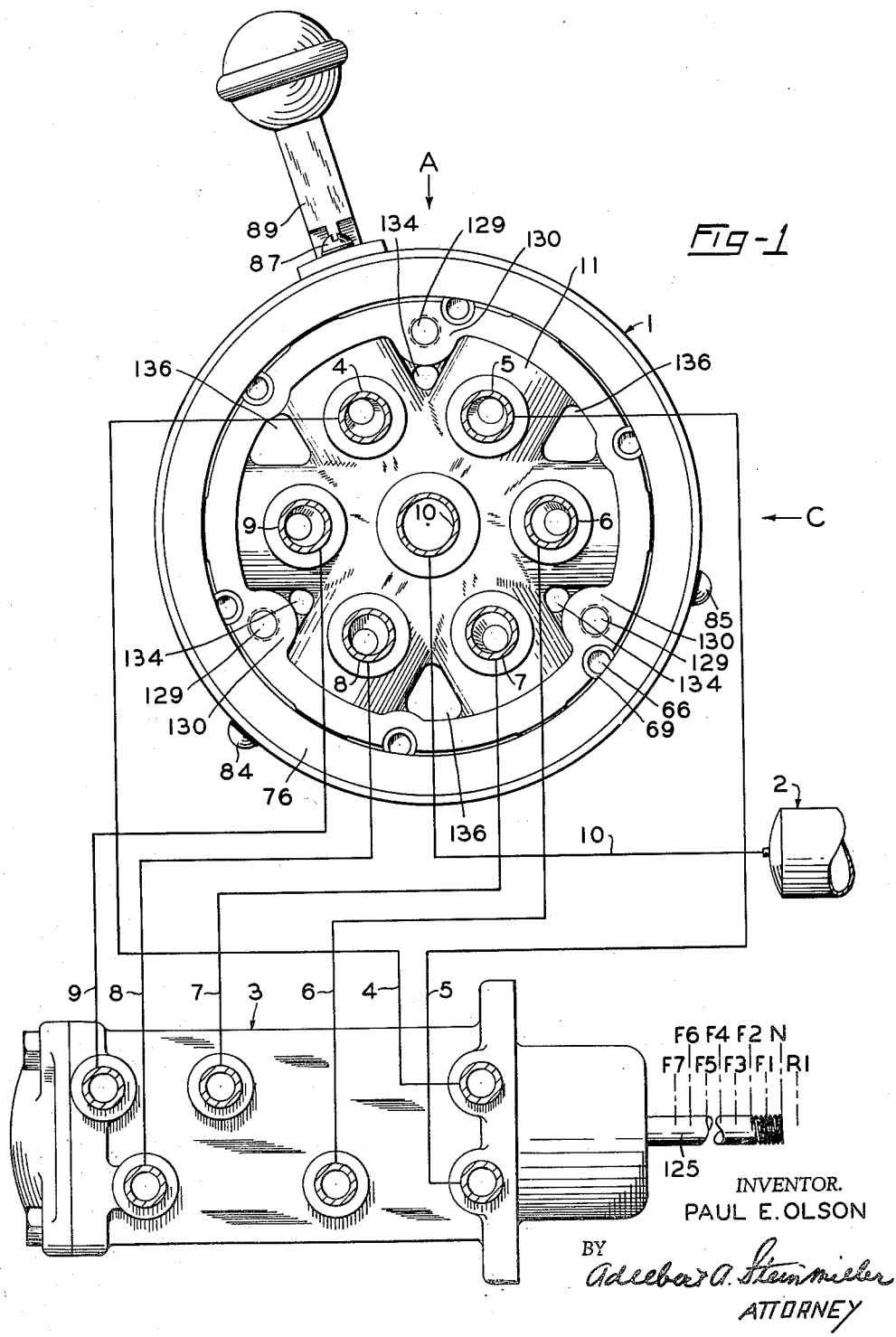

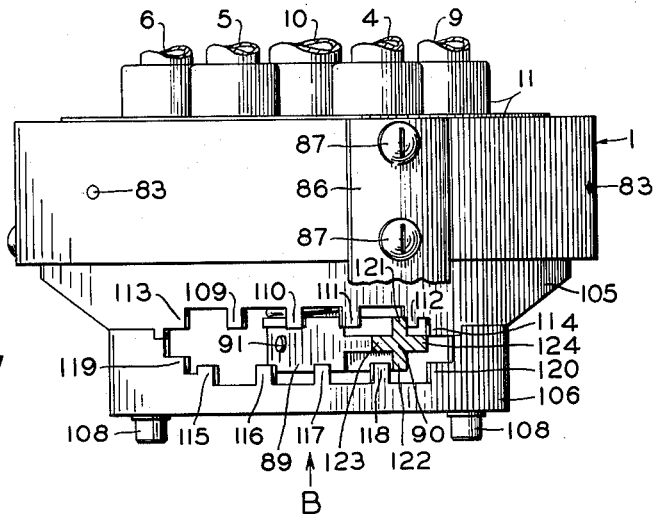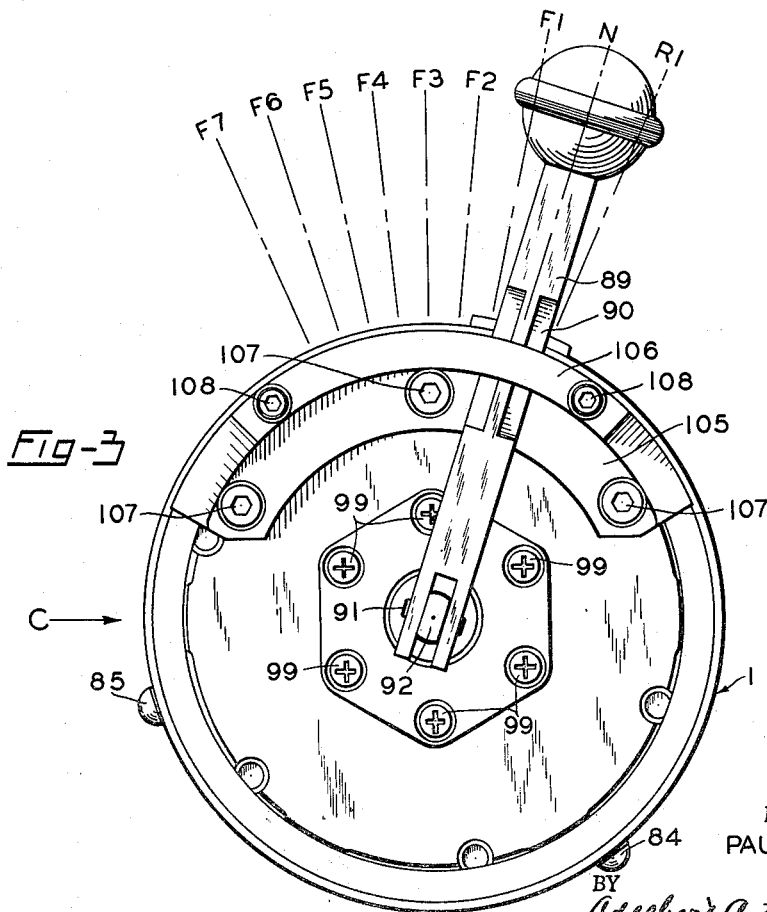

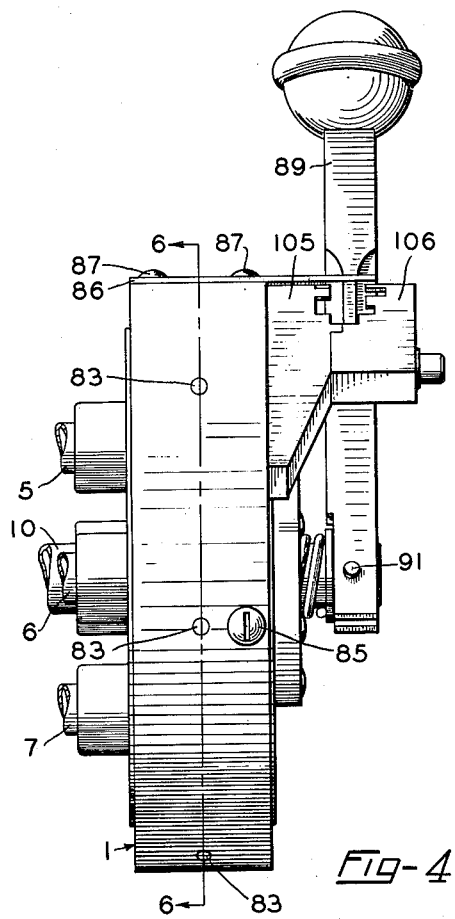
| HANDLE POSITION | PIPES TO WHICH FLUID UNDER PRESSURE IS SUPPLIED | | | | | |
|---|---|---|---|---|---|---|
| | 4 | 5 | 6 | 7 | 8 | 9 |
| R |   | X | X | X | X | X |
| N | X |   | X | X | X | X |
| F 1 |   | X |   | X | X | X |
| F 2 | X |   |   | X | X | X |
| F 3 |   | X |   |   | X | X |
| F 4 | X |   |   |   | X | X |
| F 5 |   | X |   |   |   | X |
| F 6 | X |   |   |   |   | X |
| F 7 | X |   |   |   |   |   |
INVENTOR.
PAUL E. OLSON Jan. 23, 1962  P. E. OLSON  3,017,900
MANUAL CONTROL VALVE DEVICE
Filed Nov. 17, 1959  4 Sheets-Sheet 4

United States Patent Office 3,017,900
Patented Jan. 23, 1962

3,017,900
MANUAL CONTROL VALVE DEVICE
Paul E. Olson, Pittsburgh, Pa., assignor to Westinghouse Air Brake Company, Wilmerding, Pa., a corporation of Pennsylvania
Filed Nov. 17, 1959, Ser. No. 853,616
11 Claims. (Cl. 137—620)

This invention relates to manually operated multi-position control valve devices for controlling the operation of a device such as a fluid motor, and more particularly to a manually operated control valve device in which a plurality of individual valve units are radially arranged in angularly spaced relation and selectively operable to provide any one of nine different valve position combinations to correspondingly supply or release fluid under pressure to respective ports of a device such as a fluid motor.

There are presently on the market manually operated control devices of the type in which a plurality of separate valve units are arranged in spaced-apart parallel relationship and each operated by a separate cam member mounted on a common shaft manually rotated by a single handle secured to the shaft. The handle of this type of control device may have two or more positions in each of which one or more of the valve units are operated so as to convey therethrough fluid under pressure from a source of fluid pressure to a device such as a fluid motor, and one or more of the valve units are operated concurrently to release therethrough fluid under pressure from the fluid motor to atmosphere.

In some installations where a control valve device of the multi-position manually operated type may be used, it is very important that the separate valve units are operated in a certain chosen sequence and without the possibility of the handle of the control device being rotated inadvertently or accidentally from any one of its several positions past a next adjacent position until the valve units have remained in a position to permit the supply of fluid under pressure to the fluid motor, or in a position to release fluid under pressure therefrom, a chosen interval of time to insure proper sequential operation of the fluid motor or other device to be controlled. Where such sequential operation is required, it is necessary to insure that the operating handle by which the cams for the valve units are rotated to their several different positions, cannot be rotated from any one of its several corresponding positions past a corresponding adjacent position until the handle has remained in the corresponding adjacent position the chosen interval of time required to insure that, when the valve units are operated in accordance with this corresponding adjacent position, the desired operation of the fluid motor or other device to be controlled has occurred.

Accordingly, it is the general purpose of this invention to provide a novel, lightweight, compact, inexpensive and simplified manually operated control valve device of the multiple valve unit type having a handle control means for insuring that the handle cannot overtravel when moved from any one of its several positions to an adjacent position and for insuring that the handle remains in each position a short interval of time before being shifted to an adjacent position.

Essentially, the manually operated control valve device of the present invention comprises a casing body having six radially arranged and angularly spaced bores therein in each of which is an off-and-on valve unit to cut off or establish a communication between a supply passageway and a delivery passageway or between the delivery passageway and an exhaust passageway, all of which passageways are formed in the body and connected by corresponding pipes to the device to be controlled. More specifically, the control valve device of the present invention further comprises a pivoted operating handle operatively connected to a cam ring concentrically surrounding the radially arranged valve units. Internally, the cam ring has secured thereto six cam elements or members the contour of each of which is such as to provide for operation of a corresponding one of the six valve units in a chosen sequence as the cam ring is rotated by manually turning the handle to its several positions in a corresponding sequence. Intermediate its ends a portion of the operating handle is cruciform-shaped in cross section and this portion has associated therewith a sectional quadrant plate provided with a plurality of spaced-apart projecting fingers which are so constructed and arranged as to insure movement of the handle in a zigzag manner in order to traverse a generally arcuate path.

The zigzag manner of movement of the handle of the control device of the above-mentioned type, in addition to insuring that the handle cannot overtravel when manually moved from any one of its several positions to an adjacent position also insures that the handle cannot be moved by vibration from any one of its plurality of positions in an arc to an adjacent position in the arc and thereby cause an undesired operation of the device controlled by the control valve device.

In the accompanying drawings:

FIG. 1 is a diagrammatic plan view, in outline, of a nine-position manually operated control valve device embodying the invention, together with a nine-position fluid motor controlled thereby;

FIG. 2 is an elevational view, in outline, looking in the direction of the arrow A shown in FIG. 1, and showing certain structural details of the novel manually operated control valve device shown in FIG. 1;

FIG. 3 is a plan view, in outline, looking in the direction of arrow B shown in FIG. 2, and showing certain structural details of the novel control valve device not apparent in FIGS. 1 and 2;

FIG. 4 is an elevational view, in outline, looking in the direction of arrow C in FIGS. 1 and 3 and showing the relative location of an operating handle and a pipe bracket face to which all pipe connections are made with respect to the body of the control valve device;

FIG. 5 is a handle position table indicating for each handle position the pipes, shown in FIG. 1, to which fluid under pressure is supplied to operate the fluid motor shown in FIG. 1 to a corresponding position;

Figure 6:
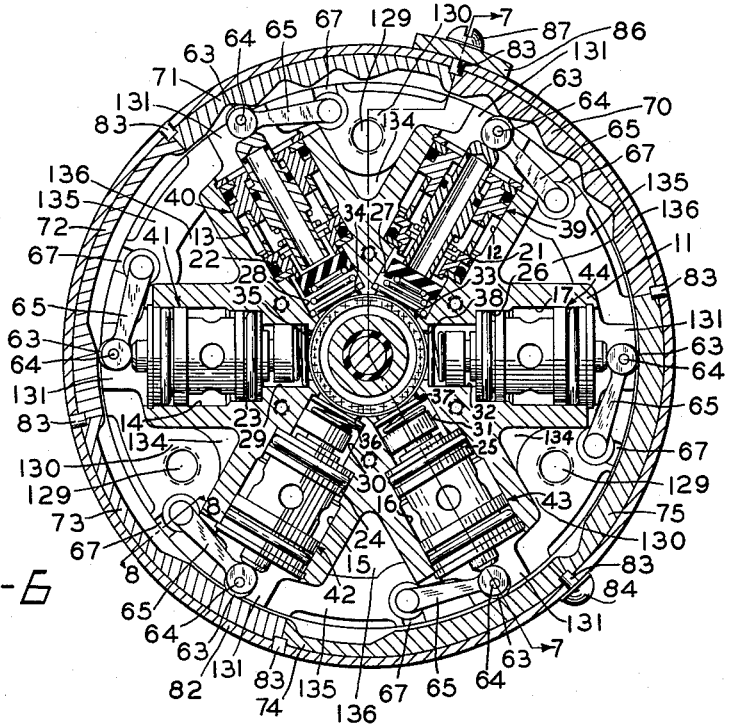
FIG. 6 is a cross-sectional view, taken along the line 6—6 of FIG. 4, looking in the direction of the arrows, and showing details of the six operating cam elements and six radially arranged valve units respectively operated thereby.
Figure 8:
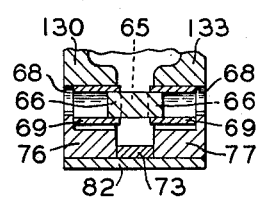
Figure 7:
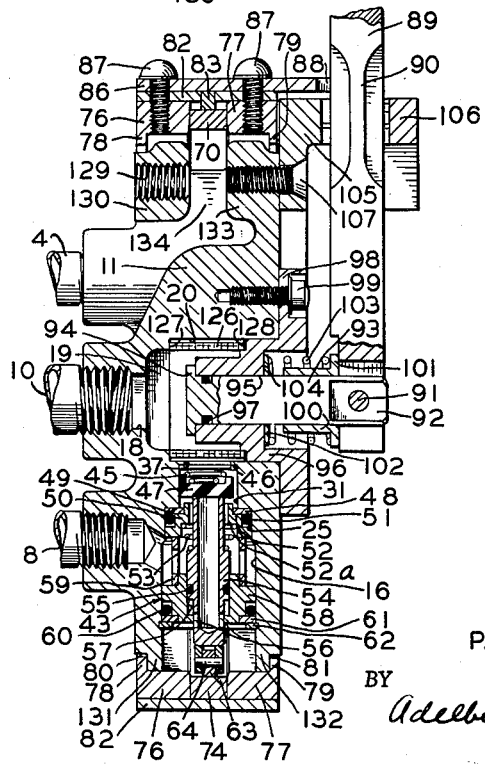

FIG. 7 is a cross-sectional view, taken along the line 7—7 of FIG. 6, looking in the direction of the arrows, and showing details of the cam ring operatively controlled by and having a driving connection with the operating handle of the novel control valve device. This view also shows certain details of construction of the body of the control valve device, including the passageways therein through which fluid under pressure is delivered to and from one of the six radially arranged valve units carried within the body and shown in detail in this view; and FIG. 8 is a partial cross-sectional view, taken along line 8—8 of FIG. 6, looking in the direction of the arrows, and showing mounting details of an operating lever for each valve unit.

Description

Referring to FIG. 1 of the drawings, the manually operated multi-position control valve device 1 embodying the invention is shown illustratively as arranged for controlling the supply of fluid under pressure from a reservoir 2, charged with fluid under pressure by a fluid compressor (not shown), to a multi-position fluid motor 3 through seven pipes 4, 5, 6, 7, 8, 9 and 10, and the release of fluid under pressure from the fluid motor to atmosphere through said pipes for controlling the operation thereof.

The control valve device 1 preferably comprises a single generally cylindrical casing section or body 11, one side or end of which constitutes a pipe bracket. There are seven tapped ports opening at one side or end of the cylindrical casing section or body 11 and into which are received one threaded end of the respective pipes 4, 5, 6, 7, 8, 9 and 10, respectively. Six of the seven tapped ports in the one side or end of the cylindrical casing section 11 are connected by corresponding passageways in the body 11 to six corresponding radially arranged counterbores 12, 13, 14, 15, 16 and 17 (FIG. 6) in the body 11, one of these tapped ports, namely the port into which is received one threaded end of the pipe 8 appearing in FIG. 7. The remaining and largest tapped port in the one side of the casing section 11, and into which is received one threaded end of the pipe 10 connected to the reservoir 2, is a supply port and this port is connected by a passageway 18 to a central chamber 19 within the body 11. The cylindrical casing section 11 is provided with a central bore 20 which at one end opens into the chamber 19 and at the opposite end opens at the side or end of the casing section opposite the one side or end having the above-mentioned seven tapped ports. The axis of the bore 20 is disposed at a right angle to the axis of each of the counterbores 12, 13, 14, 15, 16 and 17. The counterbores 12, 13, 14, 15, 16 and 17 are respectively connected to the bore 20 by a first set of corresponding coaxial counterbores 21, 22, 23, 24, 25 and 26, a second set of corresponding coaxial counterbores 27, 28, 29, 30, 31 and 32 of smaller diameter, and a set of corresponding and coaxial through bores 33, 34, 35, 36, 37 and 38 the diameter of which is less than the diameter of the counterbores 27, 28, 29, 30, 31 and 32.

Disposed respectively in each of the counterbores 12, 13, 14, 15, 16 and 17 and the corresponding series of coaxial counterbores and bores connected therewith are identical valve units 39, 40, 41, 42, 43 and 44 of the "on-off" type. Since these valve units are identical, only one will be shown and described in detail.

The valve unit 43 is shown in detail in FIG. 7. This valve unit comprises a number of parts which are assembled as follows:

First, a spring 45 is placed within the counterbore 31 so that its upper end rests against a shoulder 46 formed by the juncture of bore 37 and counterbore 31. A resilient fluted flat disc valve 47 is next pushed into the counterbore 31 so that the upper side thereof contacts the lower end of the spring 45. Thereafter, a flat annular washer 48 is put into the counterbore 25 so that its upper side rests against a shoulder 49 formed by the juncture of counterbores 25 and 31. Subsequent to putting the washer 48 within the counterbore 25, a supply valve seat 50, to which has been previously assembled an O-ring seal 51, is inserted into the counterbore 25 so that a first shoulder 52, formed on the upper side of the valve seat, rests against the lower side of the washer 48. After the supply valve seat 50 has been assembled in place, an exhaust valve spring 53 is positioned within the counterbores 16 and 25 so that its upper end rests against a second shoulder 52a formed on the lower side of the valve seat 50.

Following the positioning of the spring 53 within the counterbores 16 and 25, a hollow plunger 54, to which has been previously assembled an O-ring seal 55, and which is provided adjacent its lower end with several radially arranged openings 56, is slidably mounted within a counterbore 57 formed in a plunger guide 58. A perforated sleeve 59, an O-ring seal 60, and a flat annular washer 61 are afterwards assembled to the plunger guide 58.

When an assembly comprising a plunger 54, an O-ring seal 55, a plunger guide 58, a perforated sleeve 59, an O-ring seal 60, and a flat annular washer 61, has been assembled, as described above, the perforated sleeve end of the assembly is introduced into the open end of the counterbore 16. The assembly is then shoved upward until the parts of the valve unit 43 assume the position shown in FIG. 7. To retain the valve unit 43 in the position shown in FIG. 7, a snap ring 62 is now inserted in a groove formed in the wall of the counterbore 16.

The valve units 39, 40, 41, 42, 43 and 44 are manually operated by a cam mechanism which will now be described. The end of the plunger 54 having the radial openings 56 of each of the valve units contacts a corresponding roller 63 rotatably mounted on a pin 64 carried in a bifurcated end of a corresponding lever 65. The opposite end of each of the levers 65 has formed integral therewith and extending from opposite sides thereof a pair of pins 66 (see FIG. 8). In assembling the levers 65, the pins 66 on each lever are first inserted through one of six pair of spaced-apart radially arranged slots 67 formed in the body 11 and then centered within a corresponding pair of coaxial and spaced-apart bores 68 provided in the body and into which the slots 67 open. When the pins 66 are thus centered within the bores 68, one of two identical bushings 69 is pushed onto each of the pins 66, it being understood that the diameter of the bores 68 is slightly in excess of the diameter of the bushing 69. After the bushings 69 are thus positioned in the bores 68, the pins 66 cannot be removed or fall out through the slots 67 since the diameter of the bushings is greater than the opening provided by the slots.

Each of the rollers 63 carried in the bifurcated end of each of the levers 65 is moved toward or away from the end of the corresponding plunger 54 having the radial arranged openings 56 by a separate cam member. Each of the cam members comprises a segment of a ring having a cam contour on the internal side thereof which differs from the cam contour on each of the other cam members. For convenience of identification, the six cam members for operating the six valve units 39, 40, 41, 42, 43 and 44 through the corresponding rollers 63 and levers 65 are respectively designated by the numerals 70, 71, 72, 73, 74 and 75. As will be later explained, the cam contour of each of the cam members consists of recesses and rises for effecting corresponding operation of the valve units to release or supply position respectively, the arrangement of the cam members being such that the valve units are operated to release or supply positions in different combinations for different rotary positions of the cam members.

As is apparent from FIG. 6 of the drawings, the six cam members 70, 71, 72, 73, 74, and 75 are assembled to form a cam ring. The ends of each cam member forming this cam ring are provided with a semi-circular recess so that each two adjacent semi-circular recesses form a counterbore for receiving a dowel pin.

The cam ring constituted by the assembled cam members 70, 71, 72, 73, 74 and 75 is disposed between two other cam rings 76 and 77, as shown in FIG. 7. The cam rings 76 and 77 respectively have on one end inturned flanges 78 and 79 which are adapted to rest in corresponding annular right angle recesses 80 and 81 formed in the opposite ends of the generally cylindrical casing section 11. The three cam rings comprising the cam rings 76 and 77 and the cam ring constituted by the cam members 70, 71, 72, 73, 74 and 75 are tightly surrounded by a fourth cam ring 82, this entire assemblage being hereafter identified as the cam ring 82a. The cam ring 82 is provided with six radially arranged bores so disposed as to be coaxial with the counterbores in the cam ring formed by the cam members 70, 71, 72, 73, 74 and 75. These two cam rings are secured together by six dowel pins 83 pressed into the radially arranged coaxial bores and counterbores formed respectively in the cam ring 82 and the cam ring constituted by the cam members. The cam ring 82 is secured respectively to the cam rings 76 and 77 by two cap screws 84 and 85 (FIG. 3).

In order to manually rotate the cam ring 82a, one end of a rectangular shaped driving or actuating member 86 is secured to the cam rings 76, 77 and 82 by two cap screws 87. The opposite end of member 86 has a U-shaped slot 88 (FIG. 7).

An operating handle 89 has intermediate its ends a portion 90 of cruciform shape in cross section which portion is disposed in the U-shaped slot 88 in the member 86. One end of the handle 89 is bifurcated and is pivotally mounted, as by means of a pin 91, on a web portion 92 on one end of a stem 93. The web portion 92 comprises two parallel flat sides made by milling or machining away a portion of the stem 93 adjacent its one end. The stem 93 is provided at its opposite end with a flange 94 made integral therewith. The end of the operating stem 93 having the flange 94 is placed within the chamber 19, as viewed in FIG. 7 with the stem extending therefrom through and suitably journaled in a bore 95 in a cover or bonnet 96 mounted within the bore 20 in the body 11. The stem 93 carries an O-ring seal 97 in a peripheral annular groove therein to prevent leakage of fluid under pressure from the chamber 19 along the stem 93 to atmosphere.

The cover or bonnet 96 has a polygonal flange 98 which is attached to the body 11 by six cap screws 99.

Slidably mounted on the stem 93 to the left of the handle 89, as viewed in FIG. 7, is a sleeve 100 having a collar 101 formed on the end thereof adjacent the handle. Disposed about the sleeve 100 and between the collar 101 and an annular spring seat 102 slidably mounted on the stem 93 is a spring 103. The spring 103 acts to bias the spring seat 102 against a shoulder 104 formed on the bonnet or cover 96 and, through the collar 101, to normally bias the handle 89 to a normal position, shown in FIG. 7, at right angles to the axis of the stem 93.

Associated with the handle 89 are two generally alike but oppositely disposed and arranged abutting arcuate quadrants 105 and 106. The quadrant 105 is fastened to one end of the body 11, as by three cap screws 107, and the quadrant 106 is fastened to the same end of the body, as by two cap screws 108. When the quadrants 105 and 106 have been assembled, as shown in FIG. 2, each has projecting from one side thereof four fingers which are arranged arcuately between two right-angle projections located at the opposite ends of the opening formed by the quadrants in equally spaced-apart relation. The two right angle projections on each quadrant are slightly longer than the fingers disposed therebetween. Consequently, when the quadrants 105 and 106 are secured to the body 11 by the cap screws 107 and 108, in the manner shown in FIG. 2 of the drawings with the quadrant 105 disposed above the quadrant 106, the quadrant 105 provides four spaced-apart downward projecting fingers 109, 110, 111 and 112 and two right angle projections 113 and 114, and the quadrant 106 provides four spaced-apart upward projecting fingers 115, 116, 117 and 118 and two right angle projections 119 and 120. Furthermore, as can be clearly seen from FIG. 2, the downward projecting fingers 109, 110, 111 and 112 on the upper quadrant are disposed respectively, between the upward projecting fingers 115 and 116, 116 and 117, 117 and 118, and finger 118 and right angle projection 120, on the lower quadrant 106.

With the two quadrants 105 and 106 secured to the body 11 by the cap screws 107 and 108 respectively, the downward extending fingers on the quadrant 105 and the upward extending fingers on the quadrant 106 form a zig-zag path for the handle 89. The length and arcuate spacing of the fingers on the two quadrants is so chosen and arranged that the distance between the adjacent sides of two oppositely disposed fingers is slightly in excess of the width of one pair of coaxial arms 121 and 122, shown in FIG. 2, as the vertical arms of the cruciform portion of the handle 89, and the distance between the end of each projecting finger on either of the quadrants and that portion of the other quadrant between two adjacent fingers is also slightly greater than the total vertical height of these two vertical coaxial arms 121 and 122 of the cruciform portion of the handle. Furthermore, the distance between two adjacent right angle projections on the two quadrants, when assembled, is greater than the width or vertical height of another pair of coaxial arms 123 and 124, arranged at right angles to the first pair of coaxial arms and shown in FIG. 2 as horizontal arms but less than the height of the first mentioned pair of coaxial arms 121 and 122 shown in FIG. 2. Therefore, the recess formed between two adjacent right angle projections on the two quadrants at each end of the generally arcuate path of the handle 89 forms an opening for receiving one or the other of the arms 123 and 124 accordingly as the handle occupies one or the other of its two extreme positions, such opening being of such size and height as to permit manual rocking of the handle 89 while in either of said positions in order that the handle can be turned to an adjacent position subsequent to the rocking thereof. From the above, it is apparent that, except for the recesses at each end of the generally arcuate path of the handle 89, the width of the opening in the zigzag path, formed by the oppositely disposed fingers on the two quadrants, throughout its length between two right angle projections on a quadrant is substantially the same as the total vertical height of the two vertical coaxial arms 121 and 122 of the cruciform portion of the handle. Hence, in order to rotate the handle 89 through its operating arc past a finger, the handle 89 must be rocked either upward or downward about the pin 91, against the biasing force of the spring 103, depending upon whether the respective finger is extending upward or downward, until the respective vertical arm 121 or 122 on the cruciform portion of the handle will clear the respective finger. When the handle 89 is in this position, the other vertical arm will be in contact with the quadrant other than the quadrant carrying the respective fingers. The handle 89 can now be rotated until it contacts the next finger on the quadrant other than the quadrant carrying the respective finger. In order to rotate the handle 89 past the last mentioned next finger, the handle 89 must again be rocked about the pin 91 in a direction corresponding to the direction of projection of the finger until the respective vertical arm of the cruciform portion of the handle that extends in the opposite direction will clear this finger. The handle 89 can then be rotated until the other vertical arm contacts the next oppositely projecting finger.

Since the handle 89 is connected to the cam ring 82a through the slotted actuating member 86 and cap screws 87, rotation of the handle 89 effects rotation of the cam ring 82a and consequently operation of the valve units 39, 40, 41, 42, 43 and 44 in a certain sequence dependent upon or in accordance with the cam contour on the cam members so as to control, in certain positions of the handle 89, the supply of fluid under pressure from the reservoir 2 through certain of these valve units to certain of the pipes 4, 5, 6, 7, 8 and 9 which are connected to the fluid motor 3 and the release of fluid under pressure from certain other of these pipes to atmosphere to control operation of a power piston (not shown) of the fluid motor 3. The fingers on the quadrants 105 and 106 are so arranged that when the handle 89 is moved into contact with each of the fingers projecting into the zigzag path of movement of the handle formed by these fingers, certain of the valve units 39, 40, 41, 42, 43 and 44 will be operated to establish a communication through which fluid under pressure is conveyed from the reservoir 2 to certain of the pipes 4, 5, 6, 7, 8 and 9 and released from certain other of these pipes to atmosphere.

With the valve units 39, 40, 41, 42, 43 and 44 assembled within the body 11, as previously explained, and with the cam members 70, 71, 72, 73, 74 and 75 assembled to form the cam ring 82a, the internal contour of which is adapted to encircle the exterior ends of the plungers 54 of the valve units and provide for the operation of these valve units in a desired sequence as the cam ring is rotated, the handle 89 can be rotated to effect corresponding simultaneous rotation of the cam members by rocking and turning the handle 89 from a so-called neutral position N in which the handle 89 is shown in FIGS. 2 and 3, to eight other positions, indicated in FIG. 3 by the legends F1, F2, F3, F4, F5, F6, F7 and R1 to control the supply of fluid under pressure from the reservoir 2 through certain of the valve units 39, 40, 41, 42, 43 and 44, to certain of the pipes 4, 5, 6, 7, 8 and 9 and corresponding chambers (not shown) in the fluid motor 3, and the release of fluid under pressure from certain other of these pipes and corresponding chambers to atmosphere to control operation of the power piston of the fluid motor whereby a device such as the power transmission (not shown) of a heavy duty truck, connected to the power piston through the intermediary of such a piston rod 125, may be moved from a corresponding neutral position N to eight corresponding other positions which are indicated in FIG. 1 as first reverse position R1, first forward position F1, second forward position F2, third forward position F3, fourth forward position F4, fifth forward position F5, sixth forward position F6, and seventh forward position F7, respectively.

In order to remove the contaminants that may be present in the fluid under pressure in the storage reservoir 2 before this fluid under pressure is conveyed to the various valve units 39, 40, 41, 42, 43 and 44, a hollow foraminous element or screen 126 is disposed within the chamber 19 and between a shoulder 127 formed on the body 11 and a shoulder 128 formed on the bonnet 96.

To enable the generally cylindrical body 11 to be secured or anchored to some member, such as a bracket located in the driver's cab of a heavy duty truck, one end of the body 11 is provided with three radially arranged tapped bores 129 which extend through three corresponding bosses 130. Each of the bosses 130 is an integral part of the casting comprising the body 11. The three bosses 130 are disposed alternately between two adjacent radially arranged valve units within the body. As is obvious from FIGS. 6 and 7 of the drawings, the thickness of the bosses 130 is substantially less than the diameter of the radially arranged cylindrical portions of the body 11 in which are disposed the valve units. Therefore, in order to provide for release of fluid under pressure from each of the valve units and also to maintain the weight of the body casting 11 as low as possible, the outer ends of the radially arranged cylindrical portions of the body 11 are each provided with two parallel spaced-apart flanges 131 and 132 the thickness of which is less than the thickness of the bosses 130 and between which is disposed a roller 63 for the corresponding valve unit. It should be understood that the space between the flanges 131 and 132 constitutes a first part of two exhaust passageways for a corresponding valve unit. The remainder of the first exhaust passageway, as is clearly shown in FIG. 7, is formed between the boss 130 and a boss 133 which is also an integral part of the casting comprising the body 11, and by a first cored opening in the casting indicated by the reference numeral 134 and shown in FIG. 6 of the drawings as disposed adjacent to a corresponding boss 130.

In order to further lessen the weight of the body casting 11, and, incidentally to provide the second part of the second exhaust passageway for the valve units, the body casting 11 is provided with three pairs of spaced-apart parallel webs 135, only one web of each pair being shown in FIG. 6, disposed between two adjacent radially arranged valve units alternately with respect to the bosses 130. The third part of the second exhaust passageway for each valve unit is formed by a second cored opening in the casting comprising the body 11 indicated by the reference numeral 136 and shown in FIG. 6 of the drawings as disposed adjacent to a corresponding web 135.

It will be understood from the previous description of the valve units 39, 40, 41, 42, 43 and 44 that these valve units are in supply position or release position accordingly as the cam ring 82a is in a position in which the roller 63 for each valve unit is in contact with a rise or a recess on the interior of the cam ring. These valve units are thus referred to herein as of the "on-off" type.

Consequently, each of the valve units 39, 40, 41, 42, 43 and 44 is operative from a supply position in which the valve unit 43 is shown in FIG. 7 to a release position. Whenever a valve unit is in its supply position, the elements comprising the valve unit occupy a position corresponding to the position in which the elements of the valve element 43 are shown in FIG. 7. In this position, the supply valve 47 is unseated from the supply valve seat 50 and seated upon the upper end of the hollow plunger 54 which upper end constitutes an exhaust valve seat.

With the valve 47 seated upon the upper end of the hollow plunger 54, a communication is closed between the pipe 8 and the atmosphere. At the same time, with the valve 47 unseated from the supply valve seat 50, a communication is opened from the reservoir 2 through pipe 10, central chamber 19, screen 126, bore 31, past the unseated valve 47, and the supply valve seat 50 to the interior of the perforated sleeve 59 and thence through the perforations therein and the interior of the counterbore 16 to the pipe 8 through which fluid under pressure may be supplied to the fluid motor 3.

Each of the valve units is operative from its supply position to its release position accordingly as a rise on the interior of the cam ring 82a is moved away from the respective roller 63 and an adjacent recess on the cam ring is moved to a position in which the respective roller 63 may be disposed therein. As the cam ring 82a is thus moved, the respective spring 45 is rendered effective to move the respective valve 47 and hollow plunger 54 from the unseated position, in which the valve 47 of the valve unit 43 is shown in FIG. 7, to a seated position in which the valve 47 is seated on the respective supply valve seat 50 to close the communication from the reservoir 2 to the pipe 8.

Subsequent to the seating of valve 47 on the supply valve seat 50, the exhaust valve spring 53 is effective to continue the movement of the hollow plunger 54 in a direction in which the end thereof constituting the exhaust valve seat is moved away from the valve 47 until the respective roller 63 is disposed into the corresponding recess in the cam ring 82a. When the exhaust valve seat is thus moved away from the valve 47, the communication from the pipe 8 to atmosphere is opened through the interior of the bore 16, the perforated sleeve 59, hollow plunger 54 and the openings 56 therein and the two hereinbefore described exhaust passageways for the respective valve unit.

The multi-position fluid motor 3 may be identical in construction to the fluid motor that is disclosed and claimed in the copending United States patent application, Serial No. 815,966 of Ellis E. Hewitt, filed May 26, 1959, assigned to the assignee of this application, except the fluid motor 3 is provided with three rather than two double acting piston stop members (not shown). The additional piston stop member enables the piston rod 125 of the fluid motor 3 to be moved to nine rather than seven positions. With the above-mentioned difference of construction in mind, reference may be had to the above-mentioned copending patent application for a detailed description of the multi-position fluid motor 3 and therefore a detailed description is not deemed necessary here.

Briefly, however, the multi-position fluid motor 3 comprises a power piston to which is operatively connected a caged spring means (not shown) for yieldingly opposing movement of the power piston in either direction from a neutral position and a novel arrangement of four piston stop means to limit the amount of movement of the power piston from its neutral position to a number of definite positions on either side of the neutral position. Selective charging or venting of the different chambers of the fluid motor in different combinations resultings in movement of the power piston and piston rod 125 to corresponding different positions.

*Operation*

In operation, let it be assumed that the storage reservoir 2 is charged with fluid to some chosen pressure, such as one hundred pounds per square inch. Let it be further assumed that the handle 89 and the cam ring 82a, of the control device 1, and the multi-position fluid motor 3 occupy their neutral position N in which position they are shown respectively in the drawings.

Whenever the cam ring 82a is moved to neutral position N, the internal recesses and rises thereon acting through corresponding rollers 63 which are disposed therebetween and the exterior ends of the respective hollow plungers 54 of the valve units 39, 41, 42, 43 and 44 move these plungers radially inward.

As each of the hollow plungers 54 of the valve units 39, 41, 42, 43 and 44 is moved inward against the bias of the corresponding spring 53, the interior end of the plunger, which constitutes the exhaust valve seat, is moved into contact with the flat disc valve 47 to close communication between the corresponding pipes 4, 6, 7, 8 and 9 and atmosphere. Further inward movement of the plunger 54 of each valve unit unseats the valve 47 against the bias of the corresponding springs 45 and 53 from the corresponding supply valve seats 50. When the valve 47 of each of the valve units 39, 41, 42, 43 and 44 is thus unseated, a corresponding passageway is established through which fluid under pressure is conveyed from the chamber 19 in the control device 1 and hence pipe 10, which is connected to the storage reservoir 2, to the corresponding pipes 4, 6, 7, 8 and 9, which are connected to corresponding chambers in the fluid motor 3. Also, whenever the cam ring 82a is moved to neutral position N, one of the rises thereon is moved away from the roller 63 disposed therebetween and the exterior end of the hollow plunger 54 of the valve unit 40. As this rise on the cam ring 82a is moved away from the corresponding roller 63, the spring 53 moves the plunger 54 radially outward to maintain the exterior end of the plunger in contact with the roller and the roller in contact with the cam surface on cam ring 82a. Simultaneously, as the plunger 54 moves radially outward, the spring 45 moves the disc valve 47 of the valve unit 40 toward the supply valve seat 50 of this valve unit until the valve 47 is seated on the seat 50 to close communication between the chamber 19 in the control device 1 and the pipe 5 which is connected at one end to the valve unit 40 and at the opposite end to a corresponding chamber in the fluid motor 3. Outward movement of the plunger 54 by the spring 53 after the disc valve 47 is seated on seat 50, moves the interior end of the plunger, which constitutes the exhaust valve seat, away from the now seated disc valve 47. Upon movement of the interior end of the plunger 55 away from the disc valve 47, a communication is established from the pipe 5 and corresponding chamber in the fluid motor 3 to the interior of the counterbore 13 of the valve unit 40, thence through the perforated sleeve 59, past the exhaust valve seat to the interior of the hollow plunger 54, through the openings 56 in the plunger and to atmosphere through the two exhaust passageways hereinbefore described for each valve unit to completely vent fluid under pressure from the corresponding chamber.

The position table of FIG. 5 indicates the charged and vented pipes corresponding to the neutral position N of the operating handle 89. Consequently, the fluid under pressure supplied to the pipes 4, 6, 7, 8 and 9 and the corresponding chambers in the fluid motor 3 while the cam ring 82a is in its neutral position N acts on the piston stop members and piston member, as described in detail in the hereinbefore mentioned copending application, to move the piston member to a corresponding neutral position N if the piston member is not in neutral position N or to maintain the piston member in this position. Also, as explained in detail in the hereinbefore mentioned copending application, the caged spring means is effective at this time to maintain the power piston and the piston rod 125 connected to the power piston in a corresponding neutral position N, in which position the piston rod 125 is shown in FIG. 1. Furthermore, if the piston rod 125 is connected to the power transmission of a truck, the power transmission also will be correspondingly maintained in its neutral position.

To move the power piston and piston rod 125 of the fluid motor 3 leftward in a series of steps to successive positions corresponding, for example, to the first forward position F1, second forward position F2, third forward position F3, fourth forward position F4, fifth forward position F5, sixth forward position F6 and seventh forward position F7 of the power transmission, the operator will first rock the handle 89 upward about the pin 92 against the force of spring 103, as viewed in FIG. 2, until the end of upper vertical arm 121, of the cruciform portion 90 of the handle 89 contacts that portion of the upper quadrant 105 between the downward projecting fingers 111 and 112 (FIG. 2) on this quadrant. With the end of arm 121 in contact with the quadrant 105, the lower arm 122, of the cruciform portion 90 will be in a position to clear the upward projecting finger 118 on the lower quadrant 106 if the handle is rotated counterclockwise as viewed in FIG. 3. Therefore, the operator will now turn the handle 89 in a counterclockwise direction, as viewed in FIG. 3, from neutral position N to first forward position F1 in which position the upper arm 121 will contact the downward projecting finger 111 (FIG. 2) on the upper quadrant 105 to prevent further rotation of the handle in its raised or upward position. After the arm 121 is moved into contact with the finger 111, the operator will release the handle 89 whereupon the spring 103 acting through the collar 101 on the sleeve 100, will rock the handle 89 about the pin 91 downward to a horizontal position as shown in FIG. 2.

In turning the handle 89 as just described, the cam ring 82a is rotated therewith from the position in which it is shown in FIG. 6 to a position corresponding, for example, to the first forward position F1 of the piston rod 125 of the fluid motor 3. The recesses and rises on the cam members 70, 71, 72, 73, 74 and 75 constituting a part of the cam ring 82a are so designed and constructed that, as the handle 89 is turned to its first forward position F1, these rises operate the valve units 40, 42, 43 and 44 in the manner hereinbefore explained to establish corresponding passageways through which fluid under pressure is conveyed from the chamber 19 to the corresponding pipes 5, 7, 8 and 9 to supply fluid under pressure from the reservoir 2 to these pipes and the corresponding chambers in the fluid motor 3.

Also, when the handle 89 is in its first forward position F1, the cam ring 82a is in a position in which the contour of the cam members is such that the valve units 39 and 41 are operated by their respective springs 45 and 53 to prevent the flow of fluid under pressure therethrough from the reservoir 2 to the corresponding pipes 4 and 6, and to establish corresponding passageways therethrough through which fluid under pressure may be vented from the pipes 4 and 6 and the corresponding chambers in the fluid motor 3 to atmosphere.

The fluid under pressure supplied to the fluid motor 3 through the pipes 5, 7, 8 and 9 operates the fluid motor 3 in the manner explained in detail in the hereinbefore mentioned copending application to cause the piston rod 125 to shift from its neutral position N to its first forward position F1.

Let it now be assumed that the operator desires to turn the handle 89 in a counterclockwise direction, as viewed in FIG. 3, from first forward position F1 to second forward position F2. To do so, it will be necessary for him to first rock the handle 89 downward about the pin 91 against the force of spring 103, as viewed in FIG. 2, until the end of the lower arm 122 contacts that portion of the lower quadrant 106 between the upward projecting fingers 117 and 118 (FIG. 2) on this quadrant. When so rocked, the upper arm 121 will be in a position to clear the downward projecting finger 111 on the upper quadrant 105 if the handle is turned in a counterclockwise direction as viewed in FIG. 3. Accordingly, the operator will now turn the handle in a counterclockwise direction as viewed in FIG. 3. Accordingly, the operator will now turn the handle 89 in a counterclockwise direction, as viewed in FIG. 3, from first forward position F1 to second forward position F2 in which position the lower arm 122 will contact the upward projecting finger 117 (FIG. 2) on the lower quadrant 106 to prevent further rotation of the handle in its depressed position. With the lower arm 122 in contact with the finger 117, the operator may release the handle 89 whereupon the spring 103 will rock the handle upward to a horizontal position.

As the handle 89 is turned as just described, the cam ring 82a is rotated to a position corresponding to the second forward position F2 of the piston rod 125. As the cam ring 82a is turned to the position corresponding to the second forward position F2 of piston rod 125, the rises on the cam members comprising the cam ring operate the valve units 39, 42, 43 and 44 in the manner hereinbefore explained to establish corresponding passageways through which fluid under pressure is conveyed from the chamber 19 to the corresponding pipes 4, 7, 8 and 9 to supply fluid under pressure from the reservoir 2 to these pipes and the corresponding chambers in the fluid motor 3.

Likewise, when the handle 89 is in its second forward position F2, the cam ring 82a is in a position in which the contour of the cam members is such that the valve units 40 and 41 are operated by their respective springs 45 and 53 to prevent the flow of fluid under pressure therethrough from the reservoir 2 to the corresponding pipes 5 and 6, and to establish corresponding passageways therethrough through which fluid under pressure may be vented from the pipes 5 and 6 and the corresponding chambers in the fluid motor 3 to atmosphere.

The fluid under pressure supplied to the fluid motor 3 through the pipes 4, 7, 8 and 9 operates the fluid motor 3 in the manner explained in detail in the hereinbefore mentioned copending application to cause the piston rod 125 to shift from its first forward position F1 to second forward position F2.

To continue the movement of the piston rod 125 of the fluid motor 3 leftward from its second forward position F2 to its third forward position F3, the operator will first rock the handle 89 upward about the pin 91 against the force of spring 103, as viewed in FIG. 2, until the end of upper arm 121 contacts that portion of the upper quadrant 105 between the downward projecting fingers 110 and 111 (FIG. 2) on this quadrant. The lower arm 122 will now be in a position to clear the upward projecting finger 117 on the lower quadrant 106. Consequently, the operator will turn the handle 89 in a counterclockwise direction, as viewed in FIG. 3, from second forward position F2 to third forward position F3 in which position the upper arm 121 will contact the downward projecting finger 110 (FIG. 2) on the upper quadrant 105 to prevent further rotation of the handle in its elevated position. The operator may now release the handle 89 to allow it to be returned to a horizontal position by the spring 103.

As the handle 89 is turned to its third forward position F3, the cam ring 82a is turned therewith to a corresponding position in which the rises on the cam members comprising the cam ring operate the valve units 40, 43 and 44 to establish corresponding passageways through which fluid under pressure is conveyed from the chamber 19 to the corresponding pipes 5, 8 and 9 to supply fluid under pressure from the reservoir 2 to these pipes and the corresponding chambers in the fluid motor 3.

Besides operating the valve units 40, 43 and 44 as just described, the recesses and rises on the cam ring are now in such a position as to allow the respective springs 45 and 53 of the valve units 39, 41 and 42 to operate these valve units to release fluid under pressure from the corresponding pipes 4, 6 and 7 and chambers in the fluid motor 3 to atmosphere.

The fluid under pressure supplied to the fluid motor 3 through the pipes 5, 8 and 9 operates the fluid motor 3 in the manner explained in detail in the hereinbefore mentioned copending application to cause the piston rod 125 to shift from its second forward position F2 to third forward position F3.

To shift the piston rod 125 of the fluid motor 3 from its third forward position F3 to its fourth forward position F4, the operator will rock the handle 89 downward about the pin 91 against the force of spring 103, as viewed in FIG. 2, until the end of the lower arm 122 contacts that portion of the lower quadrant between the upward projecting fingers 116 and 117 (FIG. 2) on this quadrant. Thereafter, he will turn the handle 89 in a counterclockwise direction, as viewed in FIG. 3, since the upper arm 121 will now clear the downward projecting finger 110, from third forward position F3 to fourth forward position F4 in which position the lower arm 122 will contact the upward projecting finger 116 (FIG. 2) on the lower quadrant 106. The handle 89 may now be released to allow the spring 103 to return the handle to a horizontal position.

As the handle 89 is rotated as just described, the cam ring 82a is rotated therewith to a corresponding position in which position the rises and recesses on the cam members constituting the cam ring force the plungers 54 of the valve units 39, 43 and 44 inward and allow the plungers 54 of the valve units 40, 41 and 42 to be moved outward by their corresponding springs 45 and 53. Hence, this operation of the valve units results in the supply of fluid under pressure from the reservoir 2 to the pipes 4, 8 and 9 and the corresponding chambers in the fluid motor 3, and the release of fluid under pressure from the pipes 5, 6 and 7, and the corresponding chambers in the fluid motor 3 to atmosphere.

The fluid under pressure supplied to the fluid motor 3 through the pipes 4, 8 and 9 operates the fluid motor 3 in the manner explained in detail in the hereinbefore mentioned copending application to cause the piston rod 125 to shift from its third forward position F3 to fourth forward position F4.

In order to turn the handle 89 from its fourth forward position F4 to its fifth forward position F5, the operator will now rock the handle upward about the pin 91 against the force of spring 103, as viewed in FIG. 2, until the end of the upper arm 121 contacts that portion of the upper quadrant 105 between the downward projecting fingers 109 and 110 (FIG. 2) on this quadrant. In this position of the handle 89, the lower arm 122 will now pass above the finger 116 (FIG. 2) on the lower quadrant 106, wherefore the operator will now turn the handle 89 counterclockwise, as viewed in FIG. 3, from fourth forward position F4 to fifth forward position F5, or in other words, until the upper arm 121 is moved into contact with the downward projecting finger 109 (FIG. 2) on the upper quadrant 105. Upon release of the handle 89 by the operator, the spring 103 will return the handle 89 to a horizontal position.

Turning the handle 89 to its fifth forward position F5 simultaneously turns the cam ring 82a to a corresponding position in response to which the valve units 40 and 44 establish corresponding communications through which fluid under pressure is conveyed from the reservoir 2 to the respective pipes 5 and 9 and the corresponding chambers in the fluid motor 3, and the valve units 39, 41, 42 and 43 establish corresponding communications through which fluid under pressure is vented from the pipes 4, 6, 7 and 8 and the corresponding chambers in the fluid motor 3 to atmosphere.

The fluid under pressure supplied to the fluid motor 3 through the pipes 5 and 9 operates the fluid motor 3 in the manner explained in detail in the hereinbefore mentioned copending application to cause the piston rod 125 to shift from its fourth forward position F4 to fifth forward position F5.

Assuming that the operator at this time desires to turn the handle 89 in a counterclockwise direction, as viewed in FIG. 3, from fifth forward position F5 to sixth forward position F6, it is essential that he first rock the handle 89 downward about the pin 91 against the force of spring 103, as viewed in FIG. 2, until the end of the lower arm 122 contacts that portion of the lower quadrant 106 between the upward projecting fingers 115 and 116 (FIG. 2) on this quadrant. Because in this position of the handle 89 the upper arm 121 will not strike the downward projecting finger 109 on the upper quadrant 105 if the handle is turned counterclockwise, as viewed in FIG. 3, the operator will now turn the handle counterclockwise from its fifth forward position F5 to its sixth forward position F6 in which position the lower arm 122 abuts the upward projecting finger 115 (FIG. 2) on the lower quadrant 106. The operator will now release the handle 89 to allow the spring 103 to return it to a horizontal position.

Rotating the handle 89 to its sixth forward position F6 rotates the cam ring 82a therewith to a corresponding position. As the cam ring 82a is rotated to this new position, the rises and recesses on the cam members comprising the cam ring in cooperation with the corresponding rollers 63 and plungers 54 of the six valve units condition the valve units 39 and 44 so that fluid under pressure is supplied therethrough from the reservoir 2 to the pipes 4 and 9 respectively and to the corresponding chambers in the fluid motor 3. Furthermore, at this time the valve units 40, 41, 42 and 43 are conditioned so that fluid under pressure is released therethrough from the respective pipes 5, 6, 7 and 8 and the corresponding chambers in the fluid motor 3 to atmosphere.

The fluid under pressure supplied to the fluid motor 3 through the pipes 4 and 9 operates the fluid motor 3 in the manner explained in detail in the hereinbefore mentioned copending application to cause the piston rod 125 to shift from its fifth forward position F5 to sixth forward position F6.

To move the handle 89 from its sixth forward position F6 to its seventh forward position F7 which is the final forward handle position, the operator must first rock the handle upward about the pin 91 against the force of spring 103, as viewed in FIG. 2, until the end of the upper arm 121 contacts that portion of the upper quadrant 105 between the right angle projection 113 (FIG. 2) on the left-hand end of this quadrant and the downward projecting finger 109 also on quadrant 105. In this raised position of the handle 89, the lower arm 122 is in an elevated position slightly above the top of the upward projecting finger 115 on the lower quadrant 106 so that the operator may now turn the handle 89 counterclockwise, as viewed in FIG. 2, from its sixth forward position F6 to its seventh forward position F7. It should be noted that the right angle projections 113 and 119 on the respective quadrants 105 and 106 cooperate to form a recess or opening for receiving arm 123 of the cruciform portion 90 of the handle 89 when it is turned from its sixth forward position F6 to its seventh forward position F7. Furthermore, the height of this opening is such as to allow the spring 103 to return the handle 89 to a horizontal position when released by the operator after he has turned it to its final forward position. In this horizontal position the left-hand side of the upper arm 121 contacts the vertical portion of the right angle projection 113 and the left-hand side of the lower arm 122 contacts the vertical portion of the right angle projection 119.

At the same time as the handle 89 is turned toward its final forward position, the cam ring 82a is also turned toward a corresponding position in which the rises on the cam ring are moved away from the plungers 54 of all the valve units except the valve unit 39. Consequently, in this final forward position F7 of the handle 89, fluid under pressure is supplied from the reservoir 2 through only the valve unit 39 and pipe 4 to the corresponding chamber in the fluid motor 3. At the same time, fluid under pressure is released from the pipes 5, 6, 7, 8 and 9 and the corresponding chambers in the fluid motor 3 to atmospheric since the rises on the cam ring 82a are moved away from the plungers 54 of the corresponding valve units 40, 41, 42, 43 and 44 as the handle 89 is moved to its final forward position and the respective rollers 63 are moved to a position in which they are disposed in adjacent corresponding recesses on the cam ring.

The fluid under pressure supplied to the fluid motor 3 through the pipe 4 operates the fluid motor 3 in the manner explained in detail in the hereinbefore mentioned copending application to cause the piston rod 125 to shift from its sixth forward position F6 to seventh forward position F7.

With the handle 89 and the cam ring 82a in their respective positions corresponding to the seventh forward position F7 of the piston rod 125, the operator may, by first rocking the handle 89 upward or downward accordingly as an adjacent finger on one of the quadrants projects upward or downward and subsequently turning the handle until one of the arms 121 or 122 contacts the next adjacent finger on the other quadrant, move the handle successively back through the previous seven forward positions to move the piston rod 125 in steps back to the neutral position N in which it is shown in FIG. 1 of the drawings.

Let it be assumed that the handle 89 and the piston rod 125 occupy their neutral position N in which position they are shown in FIG. 1 of the drawings. When the handle 89 occupies its neutral position N in which position it is shown in FIG. 1 and also in FIG. 3 of the drawings, the cam ring 82a occupies a corresponding position in which position it is shown in FIG. 6. Let it be further assumed that the operator desires to move the piston rod 125 rightward to a first reverse position R1. To do so, the operator will first rock the handle 89 downward about the pin 91 against the force of spring 103, as viewed in FIG. 2, until the lower arm 122 contacts that portion of the lower quadrant 106 between the finger 118 and the right angle projection 120 (FIG. 2) on the right-hand end of this quadrant. In this depressed position of the handle 89, the upper arm 121 is in a position to clear the downward projecting finger 112 on the upper quadrant 105. Thence, the handle 89 may now be turned clockwise, as viewed in FIG. 3, from its neutral position N to its first reverse position R1. It is apparent from FIG. 2 that the right angle projections 114 and 120 on the respective quadrants 105 and 106 cooperate to provide an aperture into which is received the arm 124 of the cruciform portion 90 of the handle 89 when it is turned from its neutral position N to its first reverse position R1. Also, it is obvious from FIG. 2 that the size of this aperture is sufficient to allow the spring 103 to restore the handle 89 to a horizontal position subsequent to its release by the operator after he has turned it to its first reverse position R1. In this horizontal position the right-hand side of the arms 121 and 122 respectively contact the vertical portions of the right angle projections 114 and 120 on the respective quadrants 105 and 106.

As the handle 89 is turned to its First Reverse position R1, the cam ring 82a is rotated from the position in which it is shown in FIG. 6 to a position corresponding to the first reverse position R1 of the handle 89. With the cam ring 82a now in its first reverse position R1, the valve units 40, 41, 42, 43 and 44 connect the chamber 19 in the control device 1 to the respective pipes 5, 6, 7, 8 and 9 to supply fluid under pressure from the reservoir 2 to these pipes and the corresponding chambers in the fluid motor 3. Also, when the cam ring 82a is in its first reverse position R1, the valve unit 39 connects the pipe 4 and the corresponding chamber in the fluid motor 3 to atmosphere.

The fluid under pressure supplied to the fluid motor 3 through the pipes 5, 6, 7, 8 and 9 operates the fluid motor 3 in the manner explained in detail in the hereinbefore mentioned copending application to cause the piston rod 125 to shift from its neutral position N to first reverse position R1.

With the handle 89 in the first reverse position R1, the operator may, by first rocking the handle downward, and thereafter turning it counterclockwise, as viewed in FIG. 3, until the lower arm 122 contacts the upward projecting finger 118, moves the handle back to its neutral position N to move the piston rod 125 back to the neutral position N in which it is shown in FIG. 1.

It may be noted that with the handle 89 horizontal and in any of its nine positions, turning of the handle is prevented by a finger on one of the quadrants 105 and 106 until the handle is rocked upward or downward out of a horizontal position to a position in which one of the arms 121 or 122 will clear the finger on the one quadrant after which the handle may be turned until the other of these arms contacts a finger on the other quadrant at which time the handle must again be rocked in an opposite direction before the handle can be moved past the last mentioned finger. Consequently, the fingers on the two quadrants provide a zigzag path through which the handle 89 may be moved sequentially in steps in response to the combined upward and downward rocking and subsequent turning of the handle in a generally arcuate path. Since the handle 89 must always be rocked upward or downward prior to being turned, the interval of time required for so rocking the handle provides a chosen interval of time required to insure that, when the handle 89 and cam ring 82a are rotated from one position to an adjacent position, the desired sequential operation of the valve units 39, 40, 41, 42, 43 and 44, and the fluid motor 3, has occurred.

Having now described the invention, what I claim as new and desire to secure by Letters Patent is:

1. A manually operated control valve device, comprising in combination a casing means having radially arranged therein a plurality of bores, a plurality of on-off valve units one mounted in each of said bores, each valve unit being operable either to a fluid pressure supplying position or to a fluid pressure releasing position, a cam ring having on the interior thereof a cam surface, said cam ring being arranged in surrounding relation to said valve units with said cam surface cooperating with said valve units to control all the valve units simultaneously to cause each individual valve unit to be operated to either of its two positions in a certain chosen sequence in response to rotary movement of the cam ring, and manually operated means connected to said cam ring to rotate said cam ring to different operating positions.

2. A manually operated control valve device, comprising in combination a casing means having radially arranged therein a plurality of bores, a plurality of on-off valve units one mounted in each of said bores, each valve unit being operable either to a fluid pressure supplying position or to a fluid pressure releasing position, a cam ring having on the interior thereof a cam surface, said cam ring being arranged in surrounding relation to said valve units with said cam surface cooperating with said valve units to control all the valve units simultaneously to cause different on-off combinations of the valve units for different rotary positions of the cam ring, and manually operated means connected to said cam ring to rotate the same to different operating positions.

3. A manually operated control valve device as claimed in claim 1, further characterized in that said manually operated means comprises a shaft rotatably mounted in said casing means, and an operating handle pivotally mounted on said shaft for rocking movement thereabout out of a normal position and for turning movement about the axis of rotation of said shaft, said operating handle being operatively connected to said cam ring so as to effect rotation of said cam ring by turning movement of said handle to cause said on-off valve units to be operated thereby, and further comprising guide means providing a zigzag path in which said operating handle must move incident to turning movement thereof, said guide means preventing turning movement of said operating handle except in successive steps, each step of which is preceded by the manual rocking of said operating handle out of said normal position.

4. A manually operated control valve device as claimed in claim 1, further characterized in that said manually operated means comprises a shaft rotatably mounted in said casing, an operating handle pivotally mounted on said shaft for rocking movement thereabout from out of a certain normal position and for turning movement about the axis of rotation of said shaft, said operating handle being operatively connected to said cam ring so as to effect rotation of said cam ring by turning movement of said handle to cause said on-off valve units to be operated thereby, said control valve device further comprising yieldable means for biasing said operating handle to said normal position at right angles to said shaft except when said operating handle is manually rocked about its pivotal connection with said shaft out of said normal position, and guide means providing a zigzag path in which said operating handle must move incidental to turning movement thereof to effect rotation of said cam ring.

5. A manually operated control valve device comprising in combination, a casing means having radially arranged therein a plurality of bores, a plurality of on-off valve units, one mounted in each of said bores, each valve unit being operable either to a fluid pressure supplying position or to a fluid pressure releasing position, a cam ring having on the interior thereof a cam surface, said cam ring being arranged in surrounding relation to said valve units with said cam surface cooperating with said valve units to control all the valve units simultaneously to cause each individual valve unit to be operated to either of said positions in a certain chosen sequence in response to rotary movement of the cam ring, a shaft rotatably mounted in said casing means, an operating handle of cruciform cross section having four arms at right angles and of equal length and width, said handle being pivotally mounted on said shaft for rocking movement about said shaft out of a certain normal position at right angles to said shaft and operatively connected to said cam ring to effect rotation thereof to a plurality of operating positions, yieldable means for normally biasing said operating handle to said normal position, and guide means including obstructions impeding rotatable movement of said operating handle out of each of said operating positions to an adjacent operating position except in successive staggered steps responsively to successive rockings of said operating handle out of said normal position in order to enable said operating handle to clear said obstructions.

6. A manually operated control valve device, as claimed in claim 5, in which the said guide means for said operating handle comprises a pair of identical arcuate guide elements oppositely arranged in cooperative relation, each of said guide elements having fingers angularly spaced apart with the oppositely extending fingers of the said pair of guide elements being in alternate arcuately spaced relation to each other, the length of said fingers and the spacing between the ends of the oppositely extending fingers being such as to require pivotal rocking movement of the said operating handle on said shaft to a position out of said normal position in order to enable rotative movement of said operating handle past one of said fingers on one of said guide elements from one operating position to another operating position in which further movement is obstructed by contact of the operating handle with the adjacent finger of the other of said guide elements.

7. A manually operated control valve device as claimed in claim 5, further characterized in that said casing means has an annular shoulder formed at each outer edge thereof, and in that said cam ring comprises three coaxial rings of equal diameter arranged in abutting side-by-side relation, the inner of said rings having said cam surface on the interior thereof, and the outer edge of each of the two other rings having an inturned annular flange for overlapping contact with one of said annular shoulders on said casing means whereby said outer rings cooperate with said casing means and said inner ring to maintain said cam surface in surrounding relation to said on-off valve units with said cam surface cooperating with said valve units to control all the valve units simultaneously to cause each individual unit to be operated in a certain chosen sequence in response to simultaneous rotary movement of said three rings.

8. A multi-position manually operated control valve device, comprising in combination, casing means having radially arranged therein at right angles to the axis thereof a plurality of bores, a plurality of valve units, one valve unit being mounted in each of said bores and operable either to a fluid pressure supplying position or to a fluid pressure releasing position, a handle movable to any one of a plurality of operating positions, a cam ring having on the interior thereof a cam surface, means providing a driving connection between said cam ring and said handle whereby movement of said handle from one to another of its operating positions causes rotary movement of said cam ring to corresponding different rotary positions, and guide means providing a chosen path in which said handle moves, said path preventing operating movement of said handle except in successive staggered steps each of which corresponds to the angular distance between successive rotary positions of said cam ring.

9. A multi-position manually operated control valve device, comprising in combination, casing means having therein a plurality of bores equally spaced and radially arranged at right angles to the axis thereof, a plurality of valve units, one valve unit being mounted in each of said bores and operable either to a first position or to a second position, an operating handle for said valve units, a cam ring having a cam surface on the interior thereof to form a cam surface arranged in cooperative relation around said valve units and rotatively shiftable to any one of a plurality of arcuately spaced-apart operating positions to effect corresponding operation of each of the valve units, means including a driving connection between said operating handle and said cam ring to cause rotary movement of said cam ring around said valve units responsively to movement of said handle through a generally arcuate path, and guide means through which said handle moves, said guide means preventing continued movement of said handle in said generally arcuate path except in successive staggered steps each step corresponding in arcuate distance to the arcuate spacing of the operating positions of said cam ring.

10. A control valve device as claimed in claim 9, further characterized in that said cam ring comprises a plurality of sections corresponding in number to the number of valve units, the cam surface on the interior of each section differing from that on the interior of each of the other sections to provide a chosen sequence for operation of the corresponding valve unit.

11. A control valve device as claimed in claim 9, further characterized in that said cam ring comprises a plurality of sections corresponding in number to the number of valve units, the cam surface on the interior of each section differing from that on the interior of each of the other sections, and a ring member to the interior of which said sections are rigidly secured.

References Cited in the file of this patent
UNITED STATES PATENTS

| 1,085,854 | Elbe | Feb. 3, 1914 |
| 1,132,525 | Porter | Mar. 16, 1915 |
| 2,397,299 | Strid | Mar. 26, 1946 |
| 2,630,786 | Poore | Mar. 10, 1953 |
| 2,715,512 | Miller et al. | Aug. 16, 1955 |
| 2,783,775 | Fullwood | Mar. 5, 1957 |

FOREIGN PATENTS

| 561,628 | Great Britain | May 26, 1944 |